United States Patent
Chen et al.

(10) Patent No.: US 11,543,703 B2
(45) Date of Patent: Jan. 3, 2023

(54) DISPLAY APPARATUS

(71) Applicant: Innolux Corporation, Miao-Li County (TW)

(72) Inventors: Shao-Hong Chen, Miao-Li County (TW); Jui-Kang Tsui, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/585,739

(22) Filed: Jan. 27, 2022

(65) Prior Publication Data

US 2022/0146871 A1    May 12, 2022

Related U.S. Application Data

(63) Continuation of application No. 17/153,948, filed on Jan. 21, 2021, now Pat. No. 11,269,219, which is a continuation of application No. 16/683,319, filed on Nov. 14, 2019, now Pat. No. 10,928,680.

(30) Foreign Application Priority Data

Dec. 11, 2018   (CN) .......................... 201811509647.1

(51) Int. Cl.
   *G02F 1/1333*    (2006.01)
   *G02F 1/1339*    (2006.01)
   *G02F 1/1337*    (2006.01)

(52) U.S. Cl.
   CPC .......... *G02F 1/1337* (2013.01); *G02F 1/1339* (2013.01); *G02F 1/133345* (2013.01)

(58) Field of Classification Search
   CPC ............. G02F 1/1333; G02F 1/133345; G02F 1/1337; G02F 1/133711; G02F 1/133723; G02F 1/1339
   See application file for complete search history.

(56) References Cited

U.S. PATENT DOCUMENTS

2015/0301370 A1*  10/2015  Moriwaki ............. G02F 1/1339
                                                     349/42

FOREIGN PATENT DOCUMENTS

| CN | 102662276 A | 9/2012 |
| CN | 104335111 A | 2/2015 |
| CN | 108008581 A | 5/2018 |

OTHER PUBLICATIONS

Chinese language office action dated Jul. 22, 2022, issued in application No. CN 201811509647.1.

* cited by examiner

*Primary Examiner* — Thoi V Duong
(74) *Attorney, Agent, or Firm* — McClure, Qualey & Rodack, LLP

(57) ABSTRACT

A display apparatus includes a substrate, an insulating layer, an alignment film, and a sealant. The insulating layer is disposed on the substrate and with a plurality of grooves. The alignment film is disposed on the insulating layer. The sealant is disposed on the alignment film. Wherein, the sealant overlaps at least a portion of the plurality of grooves. In a predetermined unit region, the side length of the predetermined unit region is a maximum width X of the sealant, and a total side length of the portions of the plurality of grooves located in the predetermined unit region is greater than 8 times of the maximum width X.

13 Claims, 8 Drawing Sheets

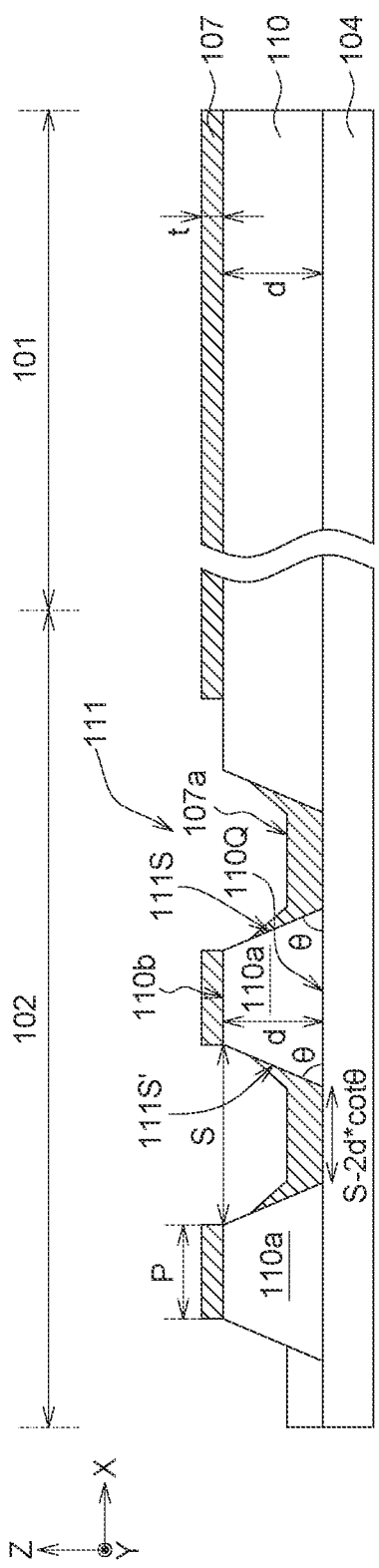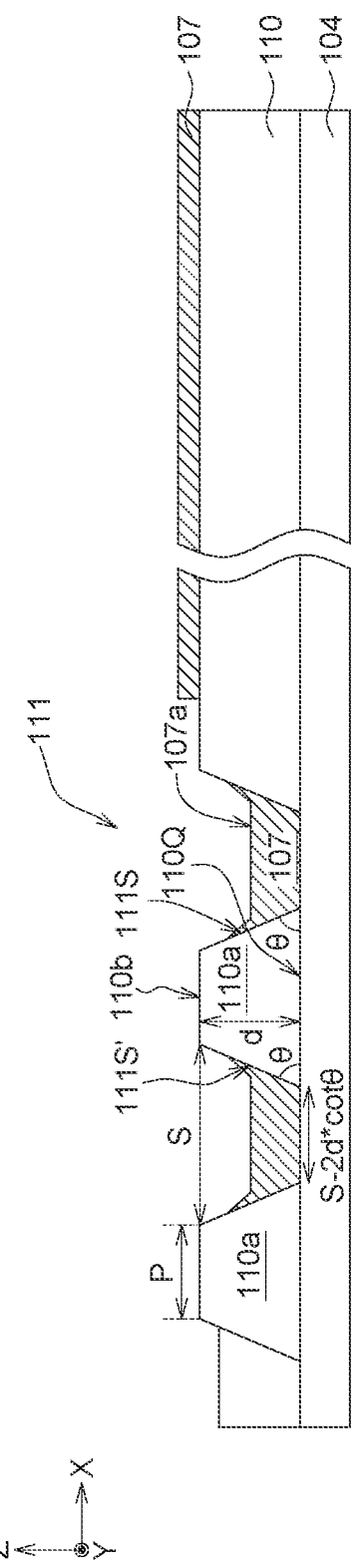

DISPLAY APPARATUS

This is a Continuation of U.S. application Ser. No. 17/153,948, filed Jan. 21, 2021, which is a Continuation application of U.S. application Ser. No. 16/683,319, filed on Nov. 14, 2019 (now patented as U.S. Pat. No. 10,928,680, issued Feb. 23, 2021), which claims the benefit of People's Republic of China application Serial No. 201811509647.1, filed on Dec. 11, 2018, the subject matters of which are incorporated herein by reference.

BACKGROUND OF THE INVENTION

Field of the Invention

The present disclosure relates in general to a display apparatus, and more particularly to a display apparatus having a liquid crystal panel.

Description of the Related Art

A panel of a typical liquid crystal display apparatus includes two substrates and a liquid crystal layer disposed between these two substrates, and an alignment film in contact with the liquid crystal layer is further provided between the substrates and the liquid crystal layer. The substrates may have a display region and a frame region surrounding the display region, wherein a sealant is disposed in the frame region to adhere with these two substrates.

As the development of the modern display technology, the frame region of display apparatuses is continually narrowed, the sealant originally disposed on the frame region may contact with the alignment films, due to lacking of space. However, the adhesion between the sealant and the alignment film may be so poor that may cause the sealant peeling from the substrate, and affect the quality of the liquid crystal display apparatus.

Therefore, there is a need of providing an improved display apparatus to improve the adhesion of the sealant.

SUMMARY OF THE INVENTION

One aspect of the present disclosure is related to a display apparatus, wherein the display apparatus includes a substrate, an insulating layer, an alignment film, and a sealant. The insulating layer is disposed on the substrate and with a plurality of grooves. The alignment film is disposed on the insulating layer. The sealant is disposed on the alignment film. The sealant overlaps at least a part of the plurality of grooves. In a predetermined unit region, the side length of the predetermined unit region is a maximum width X of the sealant, and a total groove side length of the plurality of grooves located in the predetermined unit region is greater than 8 times of the maximum width X.

According to above embodiments of the present disclosure, a display apparatus is provided, wherein at least one insulating layer is provided on the substrate for forming a thin film transistor; and a plurality of grooves are formed in a portion of the insulating layer disposed in a frame region of the display apparatus. A sealant is then formed on the portion of the insulating layer disposed in the frame region to make the sealant at least overlapping a portion of the plurality of grooves. Thereby, the adhesion between the sealant and the substrates can be improved by the increasing the surface contacts between the sealant and insulating layer to prevent the sealant peeling from the substrate.

BRIEF DESCRIPTION OF THE DRAWINGS

The above and other aspects of the present disclosure will become better understood with regard to the following detailed description of the preferred but non-limiting embodiment(s). The following description is made with reference to the accompanying drawings.

FIGS. 6A-6B are cross-sectional views illustrating partial fabricating structures of an alignment film according to one embodiment of the present disclosure.

DETAILED DESCRIPTION OF THE INVENTION

Present disclosure provides a display apparatus to solve the problems that a sealant is easily peeled off from the transparent substrate of a liquid crystal panel. In order to make the objects, features and advantages of the present invention more apparent, several preferred embodiments are described below in detail with reference to the accompanying drawings.

It is to be noted that the following descriptions of preferred embodiments of this disclosure are presented herein for purpose of illustration and description only not for limiting the scope of the invention. It is not intended to be exhaustive or to be limited to the precise form disclosed. Also, it is also important to point out that there may be other features, elements, steps and parameters for implementing the embodiments of the present disclosure which are not specifically illustrated.

Furthermore, the use of ordinal numbers such as "first", "second", and the like, as used in the specification and the claims are just used to modify the elements in the claims. It neither mean that it has any previous ordinal number on behalf of the requested element, nor does it represent the sequence order of one request element and another request element. These ordinal numbers are only used for enabling a requested element with a certain name for distinguishing another requested element having the same name. In addition, the positions mentioned in the specification and claims, such as "above", "upper", "on", "below", "lower" or "under", may either mean that the two elements are in direct contact, or may refer to that the two components are not in direct contact.

Those skilled in the art will be able to make equal modifications and variations without departing from the spirit and scope of the disclosure. In the different embodiments and the drawings, the same elements will be denoted by the same reference numbers.

Figure 1A:
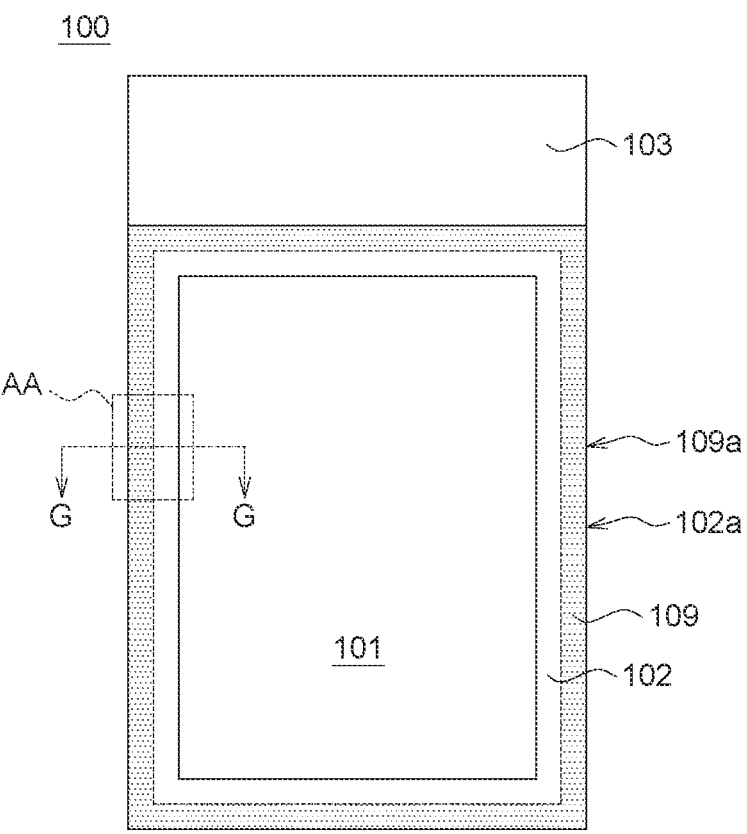
FIG. 1A is a top view illustrating the structure of a display apparatus in accordance with one embodiment of the present disclosure.
Figure 1B:
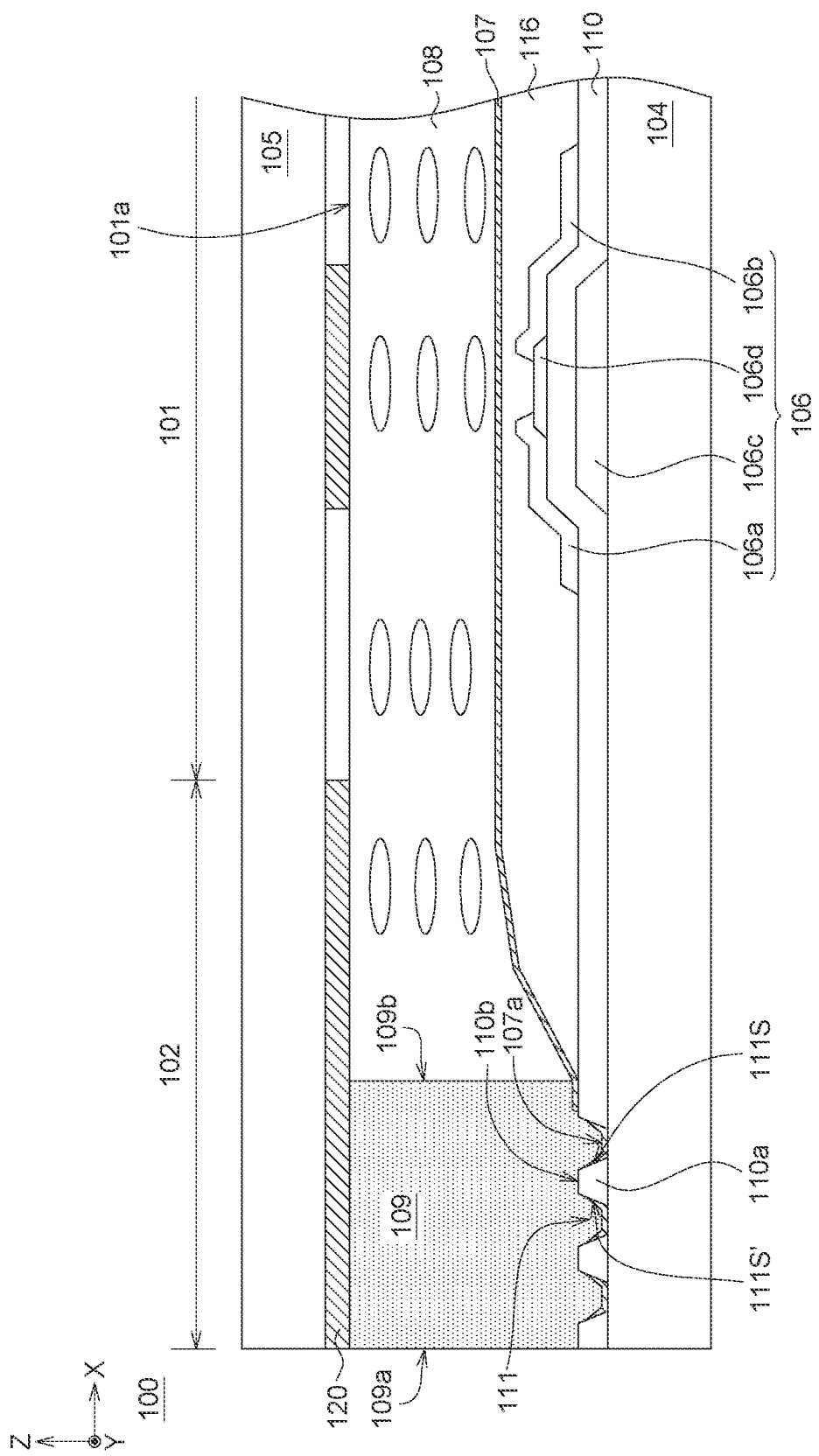
FIG. 1B is a cross-sectional view illustrating a partial structural of the display apparatus taken along a cutting line G in FIG. 1A.

FIG. 1A is a top view illustrating the structure of a display apparatus 100 in accordance with one embodiment of the present disclosure. FIG. 1B is a cross-sectional view illustrating a partial structural of the display apparatus 100 taken along a cutting line G in FIG. 1A. As shown in FIG. 1A, the display apparatus 100 has a display region 101, a frame region 102 and a bonding region 103. The display region 101 includes a plurality of pixels 101a for displaying an image. The frame region 102 is disposed at the periphery of the display region 101 and is adjacent to the display region 101. The bonding region 103 is disposed out of one side or more than one sides of the frame region 102. In the present embodiment, the bonding region 103 can be disposed out of one single side of the frame region 102, and is not limited thereto. The bonding region 103 can be used to provide pins and pads (not shown) to be bonded to an external connection line (not shown).

In some embodiments of the present disclosure, the display apparatus 100 can be a liquid crystal panel. The display apparatus 100 may include a substrate 104, a substrate 105, a plurality of thin film transistors 106, an alignment film 107, a liquid crystal layer 108, a sealant 109, an insulating layer 116, and an insulating layer 110. The substrate 105 is disposed on the substrate 104, and the liquid crystal layer 108 is disposed between the substrate 104 and the substrate 105. In order to guide the liquid crystal molecules in the liquid crystal layer 108 aligning in the same direction, the alignment film 107 can be disposed on the substrate 104 and adjacent to the liquid crystal layer 108 to make the liquid crystal molecules having a predetermined pretilt angle. The insulating layer 116 can be disposed between the alignment film 107 and the thin film transistors 106, and the insulating layer 116 may be a planarization layer. The display apparatus 100 may further include a light shielding layer 120 disposed between the substrate 105 and the liquid crystal layer 108 covering the frame region 102; and a portion of the light shielding layer 120 is disposed in the display region 101. Wherein a pixel light-emitting region 101a may be a light-transmitting region defined by the portion of the light shielding layer 120 disposed in the display region 101 (for example, the light shielding layer 120 may be a black matrix, a metal layer or a filter layer overlap). Alternatively, the pixel light-emitting region 101a may be a light-emitting region of an organic light-emitting layer in an organic light-emitting diode. The pixel light-emitting region 101a may also be a light emitting region in an inorganic light-emitting diode. In the pixel light-emitting region 101a, the plural thin film transistors 106 can be electrically connected to the pixel electrodes (not shown) for controlling the on/off state of each pixel.

The substrate 104 and the substrate 105 may be a rigid substrate or a flexible substrate. The materials of the substrate 104 and the substrate 105 may include glass, polyimide (PI), polyethylene terephthalate (PET) or any other light-transmitting plate or film material suitable for forming a substrate, but it is not limited thereto. In addition, although the display apparatus 100 illustrated in the embodiment is rectangular, the shape thereof is not limited thereto. The shape of the display apparatus 100 may be triangular, prismatic, trapezoidal, wedge-shaped, other polygonal or irregular with arc edges. The shapes of the substrate 104 and the substrate 105 may also be different, and the dimensions of these two substrates may not be strictly limited. The dimensions of the substrate 104 and the substrate 105 can be substantially the same or different.

Referring to FIG. 1A, in the top view, the alignment film 107 may cover the display region 101, the frame region 102, or the bonding region 103, either partially or a whole region thereof, which is not limited thereto. In the present embodiment, the alignment film 107 covers the entire display region 101 and the entire frame region 102. In some other embodiments of the present disclosure, the alignment film 107 covers the entire display region 101 and a portion of the frame region 102. The alignment film 107 may be a PI alignment film or a polymer-stabilized alignment (PSA) film, but the material thereof is not limited thereto.

Referring to FIG. 1A and FIG. 1B, a plurality of thin film transistors 106 (only one of which is shown as a representative) are formed on the substrate 104, wherein the thin film transistors 106 can be selectively disposed in the display region 101 or the frame region 102 of the display apparatus 100. The thin film transistor 106 further includes a drain 106a, a source 106b, a gate 106c, and an active layer 106d. The gate electrode 106c is disposed on the substrate 104; the active layer 106d is disposed over the gate 106c, and the drain 106a and the source 106b are disposed adjacent to the active layer 106d, partially covering the two sides of the active layer 106d, and separated from each other respectively. The drain 106a, the source 106b, the gate 106c, and the active layer 106d may be formed by deposition including chemical vapor deposition (CVD) or physical vapor deposition (PVD), evaporation, sputtering or other suitable methods, but not limited thereto. The thin film transistor 106 is not limited to be a bottom gate (BG) thin film transistor, a top gate (TG) thin film transistor, or a combination of these two.

There may be at least one or more insulating layers disposed between the alignment film 107 and the substrate 104, and the insulating layers are formed on the substrate 104 by CVD or PVD technology for isolating different electrodes. These insulating layers may be formed of a material which can be either an inorganic material or an organic material, and the material may be, for example, silicon nitride (SiNx), silicon oxide (SiOx) or polyfluoroalkoxy (PPA), but is not limited thereto. In the present embodiment (in the cross-sectional view of FIG. 1B), one of the insulating layers, such as the insulating layer 110, is disposed between the source 106b and the gate 106c and may serve as the gate dielectric layer of the thin film transistor 106, but not limited thereto. In some other embodiments, the insulating layer 110 may be disposed on the drain 106a and the source 106b serving as a protective layer thereof, serving as one of organic insulating layers (PFA), or serving as one of the insulating layers disposed between the semiconductor active layer 106d and the substrate 104. In the top view, the insulating layer 110 may cover the display region 101, the frame region 102, or the bonding region 103, either partially or a whole region thereof, which is not limited thereto. In the present embodiment, the insulating layer 110 covers the entire display region 101 and the entire frame region 102.

The portion of the insulating layer 110 disposed in the frame region 102 can be formed by a semiconductor process including steps of transferring the pattern of a reticle onto the substrate 104 by photolithography, and then removing the portion of the insulating layer 110 that is not protected by the photoresist, whereby the portion of the insulating layer 110 disposed in the frame region 102 has a plurality of grooves 111 and a plurality of protrusions 110a. The protrusions 110a are defined by the sidewalls 111S and 111S' of two adjacent grooves 111 and the top portion 110b of the protrusions 110a. In the present embodiment, one of the protrusions 110a may be a hill-like protrusion (such as a trapezoid protrusion) having the sidewall 111S or 111S' extending outward. In some other embodiments, the shape of the top portion 110b of the protrusions 110a and the sidewall 111S or 111S' may be at least partially curved, but is not limited thereto, wherein the material of the protrusions 110a is the same as that of the insulating layer 110. In some embodiments of the present disclosure, the plurality of grooves 111 may be a plurality of continuous or discontinuous grooves, which may be, for example, elongated grooves.

Because the plurality of grooves 111 and the plurality of protrusions 110a may cause the topography of the insulating layer 110 uneven, the material for forming the alignment film 107, prior to curing, may flow along the uneven topography and partially accommodated in the grooves 111, whereby a portions of the alignment film 107 may be formed in the grooves 111, and the top surface 107a of the portion of the alignment film 107 accommodated in the grooves 111 may not extend beyond the top portion 110b of the protrusions 110a. Such that a partial of the sidewalls of the protrusions 110a (i.e. the sidewalls 111S and 111S' of the grooves 111) and the top portion 110b of the protrusions 110a may be (not limited to) contact with the alignment film 107, but it is not limited thereto. In the present embodiment, the top portion 110b of the protrusions 110a does not be contact with the alignment film 107, the sidewalls 111S and 111S' of the grooves 111 can be at least partially contact with the alignment film 107.

As shown in FIG. 1A, the sealant 109 is disposed in the frame region 102 and along the periphery of the display region 101. The shape or position of the sealant 109 formed in the frame region 102 may not be limited and can be varied according to the design requirements of the display apparatus 100. In the present embodiment, the sealant 109 can be a rectangular line in the top view, and the edge 109a of the sealant 109 can align the outer edge 102a of the frame region 102. In some other embodiments, in top view, the sealant 109 may be an irregular curve, and the edge 109a of the sealant 109 does not align the outer edge 102a of the frame region 102. It should be noted that the sealant 109 is not an absolutely equal width line in top view, and may have a maximum width X within a sampling region. In the present embodiment, the sealant 109 has a width ranging from 400 μm to 1500 μm and a maximum width X about 15000 μm within the sampling region. In some other embodiments, the sealant 109 has a width ranging from 450 μm to 850 μm. As shown in FIG. 1B, the portion of the sealant 109 disposed in the frame region 102 can be attached to the substrate 104 by selectively contacting the top surface 107a of the alignment film 107, the sidewalls 111S and 111S' of the groove 111 and the top portion 110b of the protrusions 110a. Because the poor adhesion between the sealant 109 and the alignment film 107, therefore, increasing, the total area of the contact surface formed between the sealant 109 and the top surface 110a of the protrusion 110a by the design of the groove 111. The adhesion between the sealant 109 and the substrate 104 can be improved.

Figure 2:
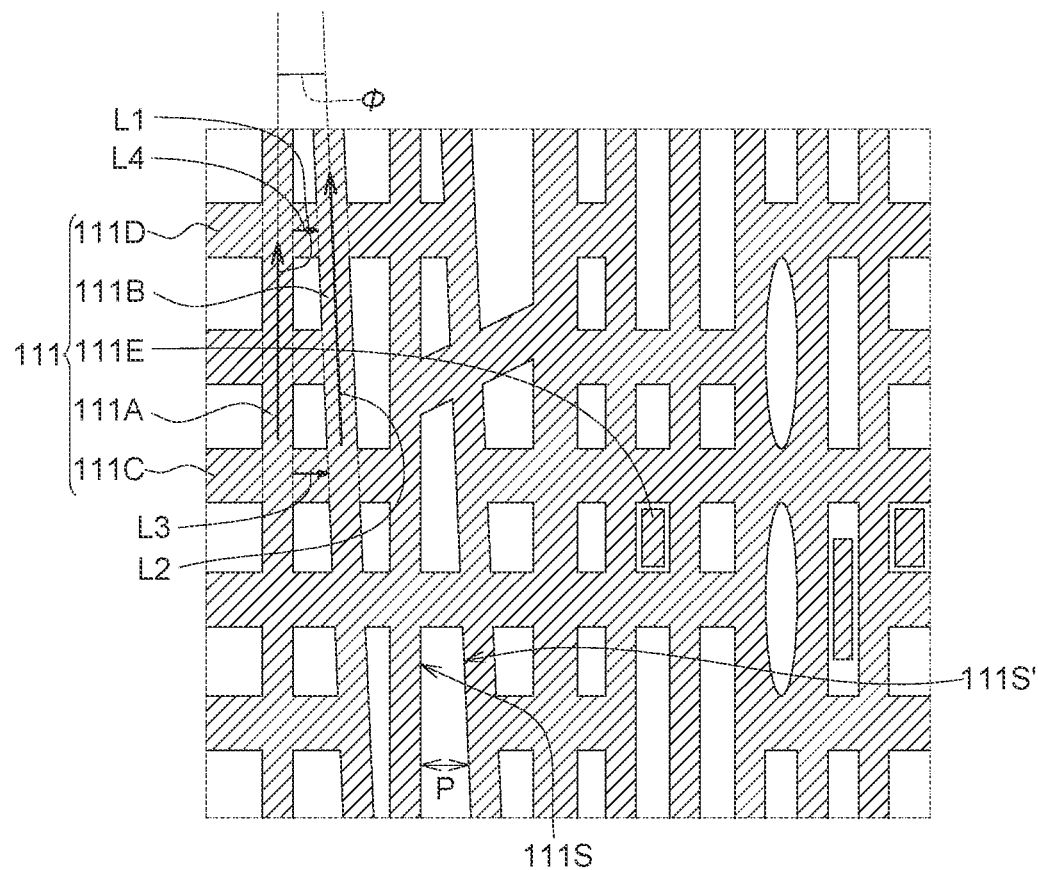
FIG. 2 is a top view illustrating the structure of an insulating layer in accordance with one embodiment of the present disclosure.

Referring to FIG. 2, the insulating layer 110 has a plurality of grooves 111, and each of the grooves 111 may optionally further include a sub-groove 111A, a sub-groove 111B, a sub-groove 111C, and a sub-groove 111D. The long axis of the sub-groove 111A extends in the direction L1 (for example, the Y direction); the long axis of the sub-groove 111B extends in the direction L2 (for example, the Y direction); the long axis of the sub-groove 111C extends in the direction L3 (for example: The X direction); the long axis of the sub-groove 111D extends in the direction L4 (for example, the X direction); and the sub-groove 111C or the sub-groove 111D may connect the sub-groove 111A and the sub-groove 111B. In other words, the sub-groove 111C and the sub-groove 111D are two lateral trenches other than the portions overlapping with the sub-groove 111A and the sub-groove 111B. The direction L3 (X) and the direction L4 (X) are different from the direction L1 (Y), and the direction L3 and the direction L4 are different from the direction L2 (Y). The direction L1 and the direction L2 may be parallel or non-parallel with each other, and may form an angle φ between each other, wherein the angle φ is less than 180°. In the present specification, the grooves 111 may be formed at the outer edge 102a of the frame region 102, and the grooves 111 may be parallel or non-parallel to each other, and are not limited thereto. The distance between the sidewalls 111S and 111S' of two adjacent grooves 111 may be represented as P (FIG. 2) that is the width of the top portion 110b of the protrusion 110a. The distance P between two adjacent grooves 111 may be equal or non-equal in width, and is not limited thereto. In another embodiment, the sidewall 111S of the grooves 111 may have some micro-roughness which can prevent the material for forming the alignment film 107 reflowing, after it flows into the grooves 111, so that less material of the alignment film 107 may be remained on the top portion 110b of the protrusion 110a. This can increase the contact area between the sealant 109 and the insulating layer 110 to improve the adhesion between the sealant 109 and the insulating layer 110. When the sealant 109 is in contact with the sidewall of the insulating layer 110 having the micro-roughness (the sidewall 111S of the grooves 111), the adhesion between the sealant 109 and the insulating layer 110 can also be improved. In another embodiment, the sidewall 111S of the grooves 111 may have a slight wave shape or a curved edge when viewed from a top view. When the substrate 109 and the aligned substrates 104 and 105 are squeezed to apply stress to the sealant 109, the wave or curved shaped sidewall 111S of the grooves 111 can contribute the support force in different directions to reduce the risk that the sealant 109 may be peeled off from the substrate 104.

FIG. 2 is a top view illustrating the structure of an insulating layer 110 disposed in the frame region 102. In one embodiment of the present disclosure, the direction L1 may be parallel to the direction L2; the direction L3 may be perpendicular to the direction L1 or the direction L4 may be perpendicular to the direction L1. In another embodiment, the direction L1 and the direction L2 are not parallel with each other, instead forming an angle φ less than 180°. More notably, the grooves 111 formed in the insulating layer 110 may selectively further include a groove 111E between two adjacent sub-grooves (such as the sub-grooves 111A and 111B), but not connected with the sub-groove s 111A and 111B. In the present embodiment, the sub-grooves 111E not only is disposed between the two adjacent sub-grooves 111A and 111B, but also disposed between the two adjacent sub-grooves 111C and 111D. The sub-groove 111E, in top view, may be shaped as a rectangular, a circular, an elliptical or other irregular shape, and is not limited thereto. The sub-groove 111A, the sub-groove 111B, the sub-groove 111C, the sub-groove 111D, and the sub-groove 111E may form a plurality of patterns having the same size. For example, the area of each pattern may be the same, but each of which may have different total side length; or the area of these patterns may be different, but each of which may have the same total side length. These patterns may be selectively arranged in a regular manner, and is not limited thereto. In some other embodiments, the sub-groove 111A, the sub-groove 111B, the sub-groove 111C, the sub-groove 111D and the sub-groove 111E may have different sizes according to the design requirements; the shape thereof may be not limited to a rectangle; at least one of these patterns may have a circular or arc edge. In yet another embodiment, not every groove 111 includes one sub-groove 111A, one sub-groove 111B, one sub-groove 111C, one sub-groove 111D and one sub-groove 111E. The sub-grooves 111C, the sub-grooves 111D and the sub-grooves 111E may have different distribution conditions and sizes according to the design requirements, and are not limited thereto.

Figure 3:
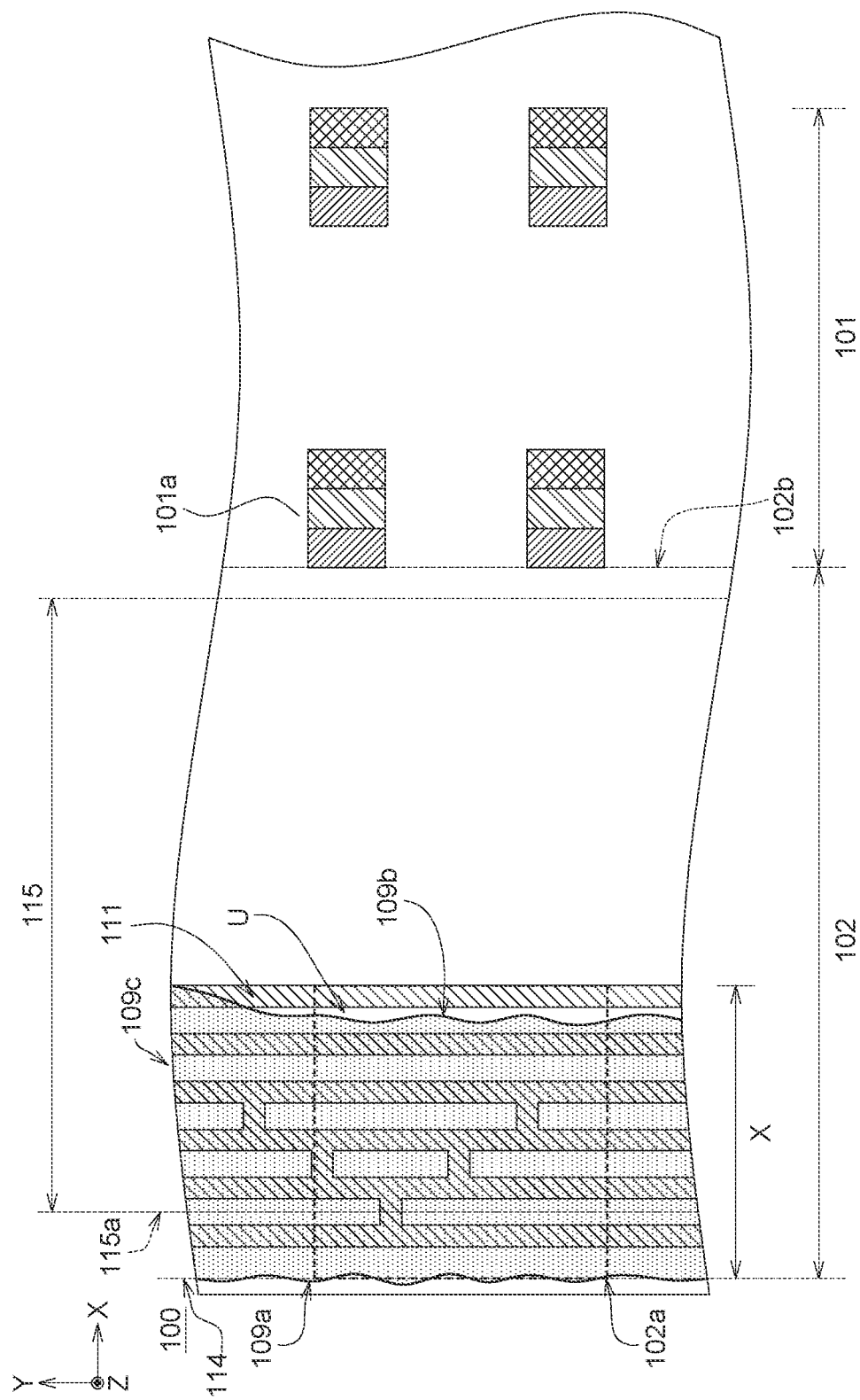
FIG. 3 is a top view illustrating a partial structure of the display apparatus as depicted in FIG. 1A.

FIG. 3 is a top view illustrating a partial structure (within a sampling region defined by the dotted line AA) of the display apparatus 100 as depicted in FIG. 1A. Within the sampling region (also referred to as a unit region U), the projection pattern 109c formed by projecting the profile of the sealant 109 onto the substrate 104 has a maximum width X from the edge 109a staying away from the display region 101 to another edge 109b getting close to the display area 101, wherein theses edges 109a and 109b serve as two opposite sides of the square unit region U with a side length of maximum width X. The square unit region U overlaps at least part of the grooves 111 and a portion of the sealant projection pattern 109c, and the area of the grooves 111 overlapping with the sealant 109 within the square unit region U is greater than or equal to 50% the area of the square unit region U. The total side length of the portions of the grooves 111 that are located in the unit region U can be referred to as the total groove side length, and the total groove side length is greater than 8 times the maximum width X (>8X). In the present embodiment, since the sealant 109 has less width variation, thus any portion of the sealant 109 disposed in the frame region 102 can be sampled to serve as the square unit region U. For example, one side of the sealant 109 aligning the outer edge 102a of the frame region 102 can be referred to a reference side of the square unit region U; and a distance counted from the reference side and getting close to the display region 101 about 1 cm or 2 cm can be referred to as the maximum width X; thereby the square unit region U can be figured out by using the reference side and the maximum width X.

Figure 4:
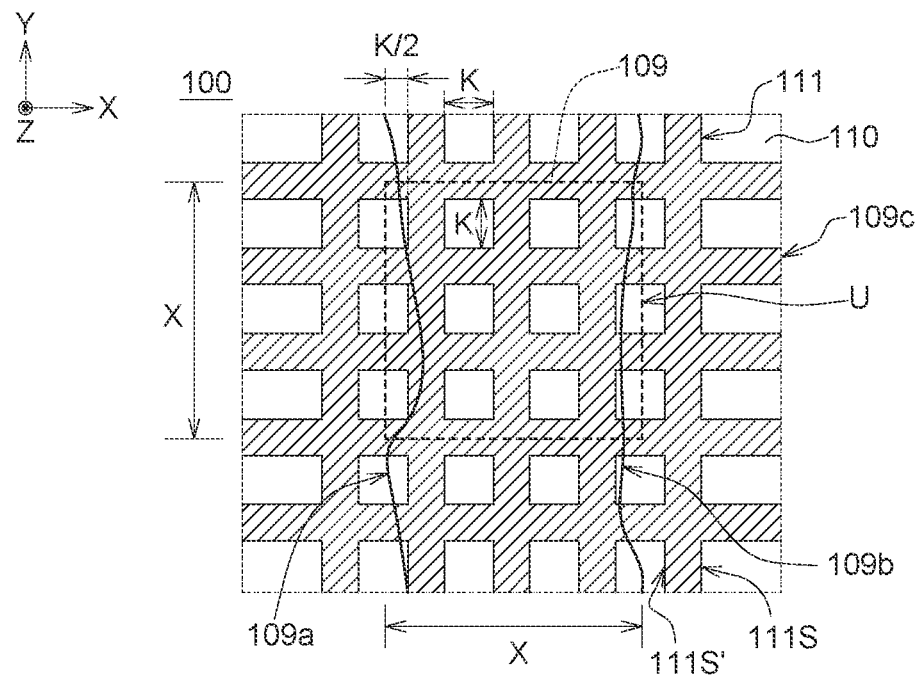
FIG. 4 is a top enlarged view illustrating a partial structure of a display apparatus in accordance with another embodiment of the present disclosure.

Referring to FIGS. 3 and 4, the method for calculating the total groove side length in the unit region U is provided as follows: FIG. 4 is a top enlarged view illustrating a partial structure of the display apparatus 100 in accordance with another embodiment of the present disclosure. In the present embodiment, as shown in FIG. 4, the portion of the grooves 111 that are located in the unit region U overlaps with the sealant projection pattern 109c, and the sides of the grooves 111 overlapping with the sealant projection pattern 109c forms six square patterns of side length k (the total side length of each square pattern is 4 k) and six incomplete squares (the total side length of each incomplete square pattern is k/2+k+k/2=2 k). The total groove side length is 6×4 k+6×2 k=36 k that is greater than 8 times the maximum width X of the sealant 109, wherein the units of k and X are the same. The total groove side length in the unit region U can be expressed by the formula (1): 36 k>8X . . . (1). The aforementioned "incomplete (square)" means the (square) pattern that formed by the sides of the grooves 111 is not completely overlapping with the sealant projection pattern 109c, when calculating the total groove length in the unit region U.

Referring to FIG. 3 again, the frame region 102 is disposed adjacent to the display region 101; the plurality of grooves 111 are formed in the portion of the insulating layer 110 that is disposed in the frame region 102; the sealant 109 has a maximum width X between the two edges 109a and 109b thereof; and the sealant 109 covers portions of the grooves 111.

The display apparatus 100 further may optionally include at least one gate on panel (GOP) 115 disposed in the frame region 102 between the edge 109b of the sealant 109 and the display region 101. GOP 115 includes at least one thin film transistor (not shown). It is noted that at least one of the thin film transistors in the GOP 115 may have a size greater than that at least one of the thin film transistor 106 disposed in the display region 101. In the present embodiment, the GOP 115 has a width ranging from 400 µm to 800 µm.

The grooves 111 are typically disposed adjacent the outer edge 102a of the frame region 102. Since the cutting line 114 is aligned with the outer edge 102a of the frame region 102, thus the portion of the frame region 102 out of the outer edge 102a of the frame region 102 could be cut off and does not appear in the final state of the display apparatus 100 after the cutting process. However, portions of the grooves 111 close to the cutting line 114 may likely be cut off by the cutting process, due to the process tolerance in the cutting process. In order to ensure that there are grooves 111 still remained in the frame region 102 after the cutting process, it is necessary to form at least three grooves 111 in the insulating layer 110 to avoid the problem of insufficient number of the grooves 111 in the final product, due to process tolerances, which may adversely affecting the adhesion of sealant.

In the present embodiment, the edge 109a of the sealant 109 is aligned with the outer edge 102a of the frame region 102, and is not limited thereto. In some other embodiments, the edges 109a of the sealant 109 may not be alignment with the outer edge 102a of the frame region 102. In the present embodiment, the distance from the cutting line 114 to the inner edge 102b of the frame area 102 may range from 800 to 1000 µm (micrometers), For example, the distance may be about 900 µm.

Figure 5:
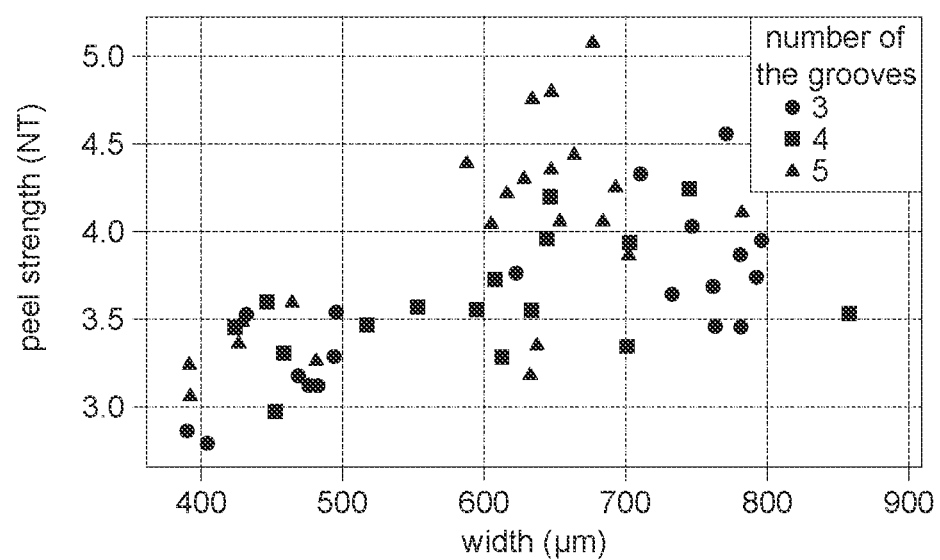
FIG. 5 is diagram illustrating the relationship between the width of a sealant and its peel strength.

FIG. 5 is diagram illustrating the relationship between the width of a sealant 109 and the peel strength measured by an adhesion test conducted on the substrate 104 including the grooves 111 as depicted in FIG. 2 and the sealant 109. According to FIG. 5, it can be determined that when the width of the sealant 109 is small (for example, less than 500 µm), there is no difference in the adhesion strength between the sealant 109 and the substrate 104 having the different number (3, 4 or 5) of the grooves 111. However, as the width of the sealant 109 is gradually increased (for example, 600 µm), the adhesive strength between the sealant 109 and the substrate 104 having more than three grooves 111 is stronger than that adhesive strength between the sealant 109 and the substrate 104 merely having three grooves 111. Therefore, the present disclosure selects the substrate 104 having more than three grooves 111 as the design trend of the display device 100.

FIGS. 6A-6B are cross-sectional views illustrating partial fabricating structures of the alignment film 107 according to one embodiment of the present disclosure. Referring to FIG. 6A, in the cross-sectional view, each one of the grooves 111 disposed in the frame region 102 has an opening width S which is the distance between the top portions 110b of the two adjacent protrusions 110a. If the opening width S is too large, on one hand, the total number of the grooves 111 may be sacrificed, and sufficient contact area may not be provided between the insulating layer 110 and the sealant 109. On the other hand, if the opening width S is too small, the space of the grooves 111 may be insufficient to accommodate the alignment film 107. Such that, the opening width S needs to be limited, for the purpose of not affecting the quality of the display apparatus 100.

FIG. 6A schematically shows the initial state when the alignment film 107 is formed over the substrate 104, wherein a portion of the alignment film 107 is formed on the top portions 110b of the protrusions 110a. Since the material for forming the alignment film 107 has fluidity, thus the material for forming the alignment film 107 may flow along the topography of the frame region 102 and reflow into the groove 111, prior to curing. As shown in FIG. 6B, the top portions 110b of the protrusions 110a has no or less residual material of the alignment film 107; and the top surface 107a of the alignment film 107 in the grooves 111 approach the top portions 110b of the protrusions 110a. However, the top surface 107a does not exceed the top portions 110b. In order to preventing the top surface 107a of the portion of the alignment film 107 accommodated in the grooves 111 to exceed beyond the top portions 110b of the protrusions 110a, the area of the grooves 111 needs to be greater than or equal to the area of the material of the alignment film 107 originally accommodated in the grooves 111 plus the area of the material subsequent reflowing into the grooves 111. This conforms to the following formula (2):

$$(S + (S - 2d \times \cot\theta)) \times d/2 \geq P \times t + S \times t \qquad (2)$$

Wherein, S represents the opening width of the grooves 111; P represents the width of the top portions 110b of the protrusions 110a, t represents the height of the portion of the alignment film 107 disposed on the display region 101. In the present embodiment, t may represent the thickness of the portion of the alignment film 107 disposed in the display region 101 corresponding to the pixel light-emitting region 101a. The thickness of the portion of the alignment film 107 may range from 0.05 μm (ie, 500 Å) to 0.15 μm or from 0.06 μm to 0.11 μm, which is not limited thereto. Since the thickness of the alignment film 107 varies depending on the position of measurement, thus, in one embodiment of the present disclosure, an average value of a three-point measurement performed on three locations in the display region 101 can be taken to estimate the thickness of the alignment film 107 corresponding to the pixel light-emitting region 101a, wherein d represents the height of the groove 111, and the units of S, P, t and d are the same. In the present embodiment, d may range from 0.3 μm to 1 μm, which is not limited thereto. θ represents the angle formed by the sidewall 111S of the groove 111 and the bottom 110Q of the protrusion 110a, wherein θ may range from 15° to 75°. In some embodiments of the present disclosure, θ ranges from 20° to 70°, which is not limited thereto. Formula (3) can be obtained by converting the formula as follows:

$$S \geq (P \times t + d^2 \times 2\cot\theta)/(d - t) \qquad (3)$$

In the present embodiment, the width P is about 20 μm; the height t is about 0.1 μm; the height d is about 0.5 μm; the angle θ is about 45°; and the opening width S≥5.625 μm.

In addition, when the unit region U defined by the maximum width X of the sealant 109 includes only three grooves 111, the total width 3S of the openings (each of a widths S) of these three grooves 111 must be smaller than the maximum width X of the sealant 109, this can be represented by the formula (4):

$$3S < X \qquad (4)$$

Therefore, combining the formula (3) with the formula (4) yields the formula (5), and the opening width S of the groove 111 needs to satisfy the formula (5):

$$1/3X > S \geq (P \times t + d^2 \times 2\cot\theta)/(d - t) \qquad (5)$$

It should be noted that when the width P of the top portions 110b of the protrusions 110a is too large, the material for forming the alignment film 107 cannot reflow easily into the grooves 111, so that a large amount of residual material of the alignment film 107 may remain on the top portion 110b, and this may adversely affect the adhesion between the sealant 109 and the substrate 104. On the other hand, when the width P of the top portions 110b of the protrusions 110a is too small, the contact area formed between the top portions 110b of the protrusions 110a and the sealant 109 may be insufficient, that also cannot increase the adhesion between the sealant 109 and the substrate 104. Therefore, those skilled in the art can obtain the formula (6) according to formula (2):

$$P \leq [S(d - t) - d^2 \cot\theta]/t \qquad (6)$$

The range of the width P of the top portions 110b of the protrusions 110a can be obtained from this formula (6). In the present embodiment, the opening width S is about 3.5 μm; the height t is about 0.1 μm; the height d is about 0.5 μm; the angle θ is about 45°; and the width P≤11.5 μm.

Figure 7A:
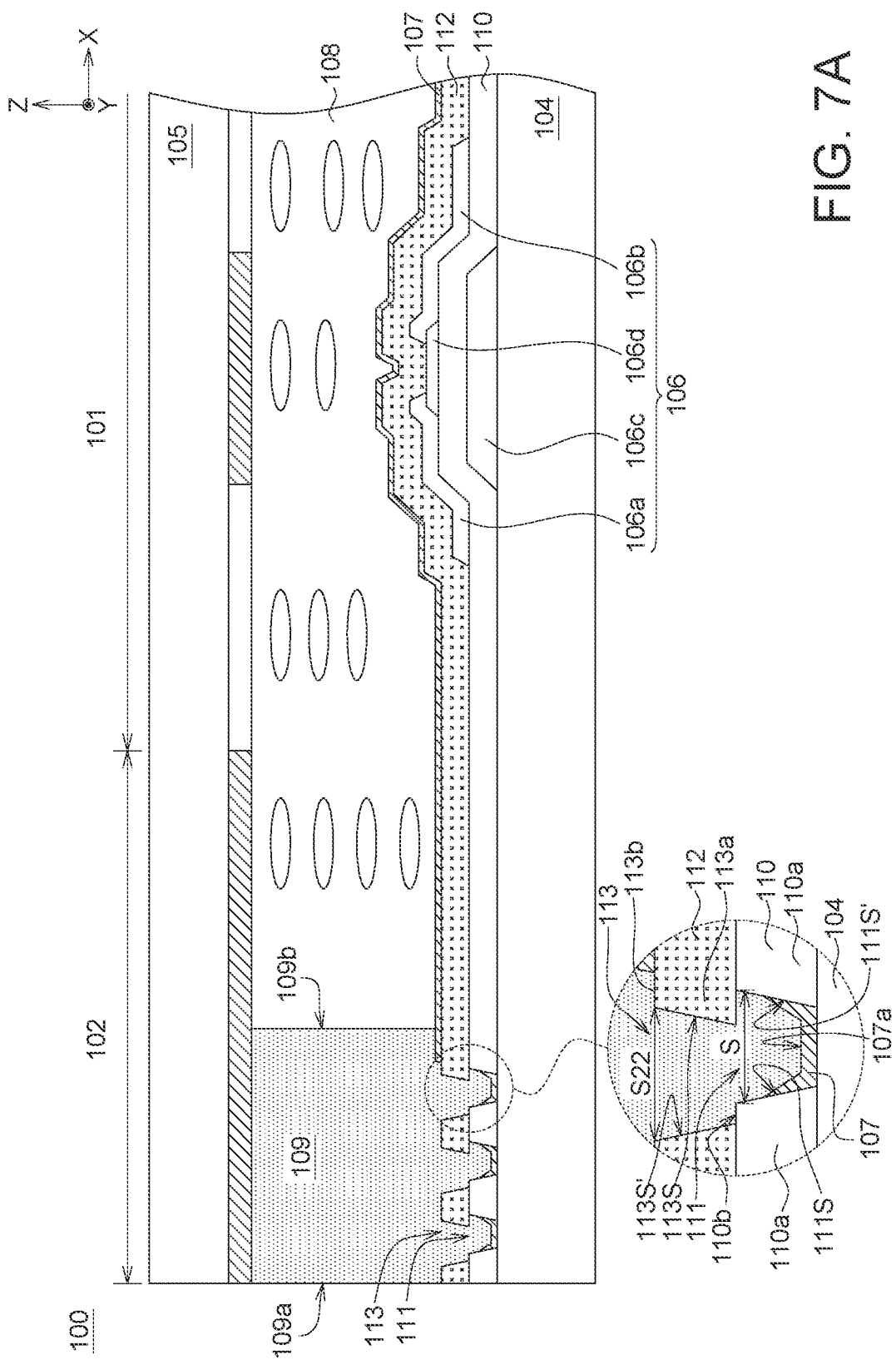
FIG. 7A is a cross-sectional view illustrating a partial structure of a display apparatus in accordance with yet another embodiment of the present disclosure.
Figure 7B:
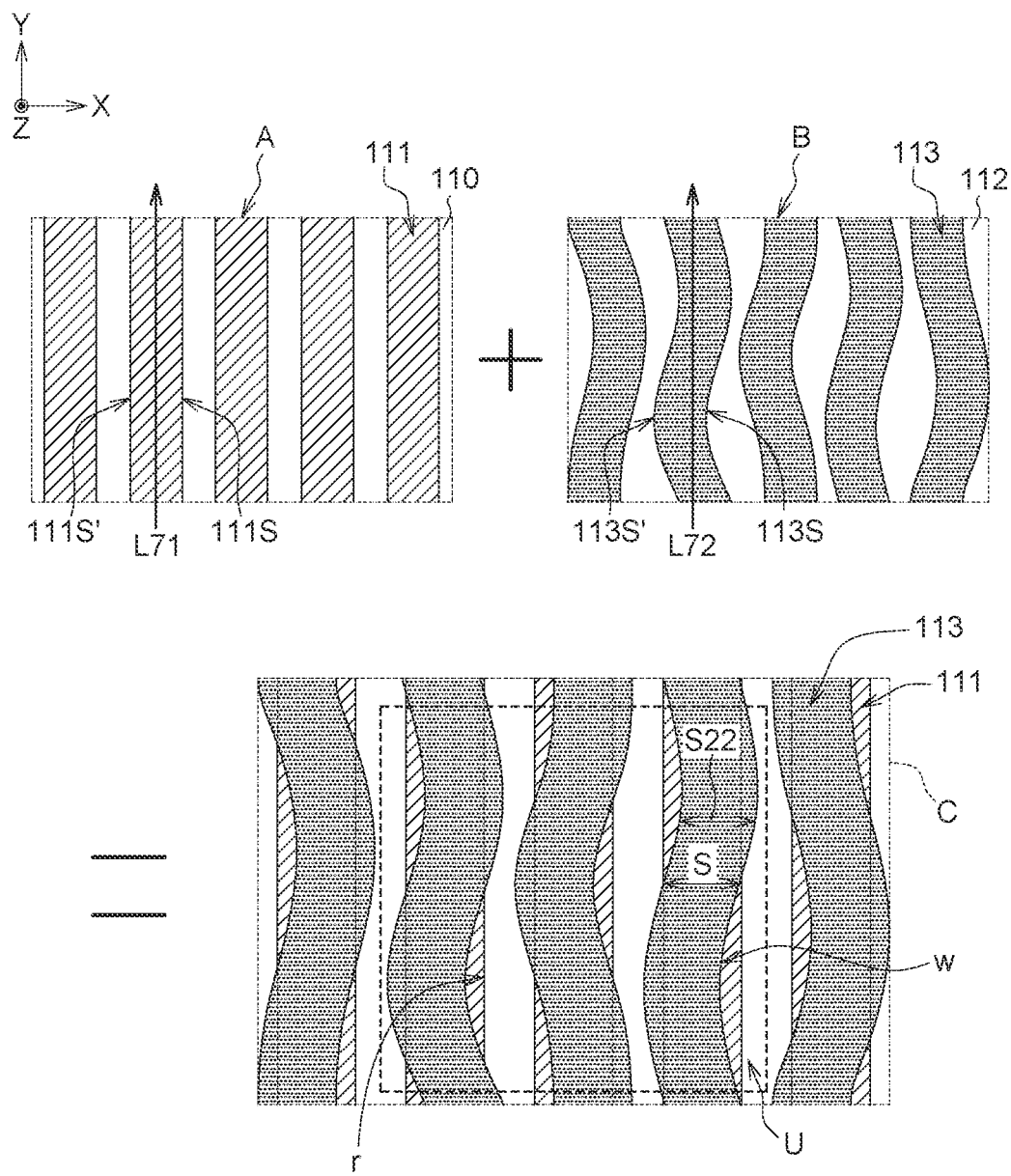
FIG. 7B are top views illustrating the partial structures of an insulating layer and another insulating layer (as depicted in FIG. 7A) and the assembly structure thereof in accordance with one embodiment of the present disclosure.

Referring to FIGS. 7A and 7B, FIG. 7A is a cross-sectional view illustrating a partial structure of a display apparatus 100 in accordance with yet another embodiment of the present disclosure; and FIG. 7B are top views illustrating the partial structures of the assembly structure of the insulating layer 110 and another insulating layer 112 (as depicted in FIG. 7A) in accordance with one embodiment of the present disclosure. In the present embodiment, the structure of the display apparatus 100 as depicted in FIG. 7A is substantially similar to that of FIG. 1B except that the display apparatus 100 depicted in FIG. 7A further includes an insulating layer 112 formed on the insulating layer 110 by CVD or PVD technology. The portion of the insulating layer 112 disposed in the display region 101 may cover at least a portion of the drain 106a, the active layer 106d, the source 106b, and the insulating layer 110. The insulating layer 112 may serve as a passivation layer of the thin film transistor 106, which is not limited thereto. In some other embodiments of the present disclosure, the insulating layer 112 can serve as a planarization layer or the like. The material of the insulating layer 112 may include, for example, silicon nitride (SiNx), silicon oxide (SiOx), or an organic material.

Referring to FIG. 7A and FIG. 1A simultaneously, the insulating layer 112 (at a top view angle) may cover the display region 101, the frame region 102, or the bonding region 103, either partially or a whole region thereof, which is not limited thereto. In the present embodiment, the insulating layer 112 and the insulating layer 110 may cover at least a portion of the display region 101 and at least a portion of the frame region 102. Referring to FIG. 7A, the portion of the insulating layer 112 disposed in the frame region 102 may have a plurality of grooves 113 and a plurality of protrusions 113a that are formed in the same manner as the aforementioned grooves 111, thus the materials and the method for manufacturing the same will not be redundantly described here. The protrusions 113a are defined by the sidewalls 113S and 113S' and the top portions 113b of two adjacent grooves 113. In the present embodiment, one of the protrusions 113a may be a hill-like protrusion (such as a trapezoid protrusion) having the sidewall 113S or 113S' extending outward. In some other embodiments of the present disclosure, the portion of the trapezoid protrusion disposed between the top portion 113b of the protrusions 113a and the sidewalls 113S or 113S' may be at least partially curved, and is not limited thereto. The material of the protrusions 113a is the same as that of the insulating layer 112. In addition, each of the grooves 113 corresponds to one of the grooves 111 and has an opening width S22. The opening width S22 is a distance between the top portions 113b of the two adjacent protrusions 113a, the opening width S22 may be the same as or different from the width S of the groove 111, and is not limited thereto.

It should be noted that, in the top view, at least one portion of the grooves 113 do not overlap with the corresponding grooves 111, and at least one portion of the grooves 111 do not overlap with the corresponding grooves 113. As shown in FIG. 7B, in the same region, the projection pattern B that formed by projecting the profiles of the plurality of grooves 113 onto the substrate 104 overlaps with the projection pattern A formed by projecting the profiles of the plurality of grooves 111 onto the substrate 104. In the projection pattern C (obtained by the overlapping of the projection pattern A and the projection B), the sidewalls 111S' of the grooves 111 is not aligned with and not parallel to the sidewalls 113S of the grooves 113. For example, in the present embodiment, the plurality of grooves 111 formed in the insulating layer 110 may include a plurality of strip-shaped (e.g. rectangular) elongated grooves; and the plurality of grooves 113 formed in the insulating layer 112 may include multiple elongated grooves having irregular shapes, such as (but not limited to) S-shaped, zigzag, twist-shaped or other irregular patterned grooves; but which is not limited thereto.

Moreover, the shape, size, and stacking order of the aforementioned grooves 111 and grooves 113 are not limited thereto. For example, in another embodiment of the present disclosure, the plurality of grooves 113 formed in the insulating layer 112 may include a plurality of strip-shaped elongated rectangular grooves; and the plurality of grooves 111 formed in the insulating layer 110 may include a plurality of irregular shaped elongated grooves.

As shown in FIG. 7A, since the sealant 109 may extend into the grooves 111 and the grooves 113, thus the contact area formed between the sealant 109 and the insulating layers 110 and 112 can be increased, so as to improve the adhesion between the sealant 109 and the substrate 104. In addition, referring to FIG. 7B, in the range of sampling, the total groove side length in the unit region U is calculated by the following manners: the total side length of the portion of the grooves 111 disposed in the unit region U plus the total side length of the portion of the groove 113 disposed in the unit region U; and any side or edge of the grooves 111 and 113 (disposed in the unit region U) that can contribute the adhesion of the sealant 109 should be included in the calculation of the total groove side length.

In detail, as shown in FIG. 7B, for example, there are three grooves 111 partially located in the unit region U that is defined/sampled in the projection pattern C. Each of the grooves 111 has two sides extending for a length r in the unit region U along the long axis L71. The total side length of the portions of the side of the three grooves 111 located in the unit region U is 3×2r. There are three grooves 113 located in the unit area U. Each of the grooves 113 has two sides extending for a length w in the unit region U along the long axis L72. The total side length of the portions of the side of the three grooves 113 located in the unit area U is 3×2w. The total groove length of the portions of grooves 111 and the grooves 113 located in the unit area U is 3×(2r+2w), wherein the unit of r and w is the same.

It should be noted that although FIG. 7A and FIG. 7B only show two layers of partially overlapping insulating layer 110 and insulating layer 112, in other embodiments of the present disclosure, the display apparatus 100 may include more similar structures of insulating layers. The pattern and stacking manner of the grooves are not limited. Those skilled in the art can vary the number of insulating layers and the pattern and stacking manner of the grooves according to the design requirements of the display apparatus 100 to improve the adhesion between the sealant 109 and the substrate 104.

According to above embodiments of the present disclosure, a display apparatus is provided, wherein at least one insulating layer is provided on the substrate for forming a thin film transistor, and a plurality of grooves are formed in a portion of the insulating layer disposed in a frame region of the display apparatus. An alignment film and a sealant are then formed on the portion of the insulating layer disposed in the frame region to make the projection of sealant onto the substrate at least overlapping with a portion of the plurality of grooves. Thereby, the surface contacts between the sealant and the insulating layer can be increased, and the adhesion between the sealant and the substrate can be improved by the aid of the surface contacts to prevent the sealant from being peeled off from the substrate.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A substrate assembly, comprising:
a substrate;
an insulating layer, disposed on the substrate and having a plurality of grooves;
a polyimide film, disposed on the insulating layer; and
a sealant, overlapped with at least a portion of the plurality of grooves; wherein in a top view and in a sampling region U, a width X of the sealant is a distance between an edge and another edge of the sealant;
wherein the insulating layer comprises a top portion of a protrusion with a width P disposed between two adjacent grooves of the plurality of the grooves; one of the two adjacent grooves has an opening with an opening width S and a sidewall; wherein the sidewall and a bottom of the protrusion form an angle θ, and the opening width S satisfies a formula as follows:

$$1/3X > S \geq (P \times t + d^2 \times 2\cot\theta)/(d-t);$$

wherein t is a height of the polyimide film, d is a height of one of the plurality of grooves, and X, S, P, t and d have the same unit.

2. The substrate assembly according to claim 1, wherein the plurality of grooves are strip-shaped elongated grooves.

3. The substrate assembly according to claim 1, wherein the edge of the sealant has a curved shape.

4. The substrate assembly according to claim 1, further comprising a display region and a frame region adjacent to the display region, wherein the sealant is disposed in the frame region.

5. The substrate assembly according to claim 4, wherein the edge is away from the display region, and the another edge is close to the display region.

6. The substrate assembly according to claim 1, further comprising a display region and a frame region adjacent to the display region, wherein the plurality of grooves are disposed in the frame region.

7. The substrate assembly according to claim 6, wherein the polyimide film is disposed in the display region.

8. The substrate assembly according to claim 6, further comprising a thin film transistor disposed in the frame region.

9. The substrate assembly according to claim 1, wherein the insulating layer is formed of an organic material.

10. The substrate assembly according to claim 1, wherein the insulating layer has more than three grooves.

11. The substrate assembly according to claim 1, wherein in a top view, at least a part of the protrusion has a curved shape.

12. A substrate assembly, comprising:
a substrate;
an insulating layer, disposed on the substrate and having a plurality of grooves;
an alignment film, disposed on the insulating layer; and
a sealant, overlapped with at least a portion of the plurality of grooves; wherein in a top view and in a sampling region U, a width X of the sealant is a distance between an edge and another edge of the sealant;
wherein the insulating layer comprises a top portion of a protrusion with a width P disposed between two adjacent grooves of the plurality of the grooves; one of the two adjacent grooves has an opening with an opening width S and a sidewall; wherein the sidewall and a bottom of the protrusion form an angle θ and the opening width S satisfies a formula as follows:

$$\tfrac{1}{3}X > S \geq (P \times t + d^2 \times 2\cot\theta)/(d-t);$$

wherein t is a height of the alignment film, d is a height of one of the plurality of grooves, and X, S, P, t and d have the same unit.

13. The substrate assembly according to claim 12, wherein in a top view, at least a part of the protrusion has a curved shape.

\* \* \* \* \*